(12) United States Patent
Dong et al.

(10) Patent No.: US 8,632,903 B2
(45) Date of Patent: Jan. 21, 2014

(54) REDOX FLOW BATTERY AND METHOD OF OPERATING THE SAME

(75) Inventors: Yongrong Dong, Osaka (JP); Toshio Shigematsu, Osaka (JP); Takahiro Kumamoto, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 13/638,323

(22) PCT Filed: Nov. 10, 2011

(86) PCT No.: PCT/JP2011/075933
§ 371 (c)(1),
(2), (4) Date: Sep. 28, 2012

(87) PCT Pub. No.: WO2012/132091
PCT Pub. Date: Oct. 4, 2012

(65) Prior Publication Data
US 2013/0157162 A1 Jun. 20, 2013

(30) Foreign Application Priority Data
Mar. 25, 2011 (JP) .................................. 2011-067422

(51) Int. Cl.
*H01M 4/36* (2006.01)
*H01M 2/36* (2006.01)
(52) U.S. Cl.
USPC ............................................. 429/105; 429/72
(58) Field of Classification Search
None
See application file for complete search history.

(56) References Cited

U.S. PATENT DOCUMENTS

| 4,362,791 A | 12/1982 | Kaneko et al. |
| 7,517,608 B2 * | 4/2009 | Brereton et al. ................. 429/71 |
| 2005/0244707 A1 * | 11/2005 | Skyllas-Kazacos et al. .. 429/105 |

(Continued)

FOREIGN PATENT DOCUMENTS

| CN | 1879244 A | 12/2006 |
| CN | 101185185 A | 5/2008 |

(Continued)

OTHER PUBLICATIONS

Wen et al., Bifunctional redox flow battery—V(III)/V(II)-glyoxal(O2) system, Electrochimica Acta 53 (2008) 3514-3522, Available online Dec. 8, 2007.*

(Continued)

*Primary Examiner* — Patrick Ryan
*Assistant Examiner* — Jose Colucci Rios
(74) *Attorney, Agent, or Firm* — Ditthavong Mori & Steiner, P.C.

(57) ABSTRACT

A redox flow battery in which a positive electrode electrolyte stored in a positive electrode tank and a negative electrode electrolyte stored in a negative electrode tank are supplied to a battery element to charge and discharge the battery is provided, the positive electrode electrolyte in the redox flow battery containing a Mn ion as a positive electrode active material, the negative electrode electrolyte containing at least one of a Ti ion, a V ion, and a Cr ion as a negative electrode active material, in which the redox flow battery includes a negative-electrode-side introduction duct in communication with inside of the negative electrode tank from outside thereof, for introducing oxidizing gas into the negative electrode tank, and a supply mechanism for supplying the oxidizing gas into the negative electrode tank via the negative-electrode-side introduction duct.

15 Claims, 4 Drawing Sheets

(56) References Cited

U.S. PATENT DOCUMENTS

| | | |
|---|---|---|
| 2006/0014074 A1 | 1/2006 | Tsuji et al. |
| 2008/0193828 A1* | 8/2008 | Sahu .............................. 429/63 |
| 2008/0220318 A1 | 9/2008 | Brereton et al. |
| 2009/0017379 A1 | 1/2009 | Inatomi et al. |
| 2011/0027681 A1 | 2/2011 | Tsuji et al. |
| 2012/0045680 A1 | 2/2012 | Dong et al. |

FOREIGN PATENT DOCUMENTS

| | | |
|---|---|---|
| JP | 57-9073 A | 1/1982 |
| JP | 2-79374 A | 3/1990 |
| JP | 4-11340 Y2 | 3/1992 |
| JP | 11-204124 A | 7/1999 |
| JP | 2006-147374 A | 6/2006 |
| JP | 2009-16217 A | 1/2009 |
| JP | 2010-244972 A | 10/2010 |
| TW | 201131877 A1 | 9/2011 |

OTHER PUBLICATIONS

Bednarz, Vanadium redox battery operating method, involves regenerating anolyte by contact with carbon monoxide, with metal such as iron, zinc and nickel, or with electrolytic cell in electrochemical manner, DE 102007011311, published Jun. 26, 2008, Derwen English summary.*

International Search Report for PCT Application No. PCT/JP2011/075933 dated Feb. 21, 2012, pp. 1-6.

Office Action for corresponding Taiwanese Patent Application No. 100146826, dated Apr. 18, 2013, 16 pages.

Chinese Office Action issued for corresponding Patent Application No. 201180020910.0 dated Jun. 28, 2013, 10 pgs.

Extended European search report for corresponding European Application No. 11861332.2 mailed Aug. 23, 2013, 10 pages.

Davis, S.M. "Plating of High Quality Electrolytic Manganese Dioxide at 120-125 Degrees C. and 6X Normal Current Density", Journal of New Materials for Electrochemical Systems, Ecole Polytechnique De Montreal, Montreal, CA, vol. 7, No. 4, Oct. 1, 2004, 12 pages.

Xue, F.Q., et al "Investigation on the electrode process of the Mn(II)/Mn(III) couple in redox flow battery" Electrochimica Acta, Elsevier Science Publishers, Barking, GB, vol. 53, No. 22, Sep. 20, 2008, 7 pages.

* cited by examiner

REDOX FLOW BATTERY AND METHOD OF OPERATING THE SAME

TECHNICAL FIELD

The present invention relates to a redox flow battery and a method of operating the same. More particularly, the present invention relates to a redox flow battery capable of generating a high electromotive force.

BACKGROUND ART

As a way to combat global warming, the introduction of new energy such as solar photovoltaic power generation and wind power generation has been promoted in recent years throughout the world. Since outputs of these power generations are affected by the weather, it is predicted that the introduction on a large scale will cause problems with operation of power systems such as difficulty in maintaining frequencies and voltages. As a way to solve such problems, the installation of large-capacity storage batteries for smoothing output variations, storing surplus power, and load leveling is expected.

A redox flow battery is one of large-capacity storage batteries. In a redox flow battery, a positive electrode electrolyte and a negative electrode electrolyte are supplied to a battery element having a membrane interposed between a positive electrode and a negative electrode, to charge and discharge the battery. An aqueous solution containing a metal ion having a valence which changes by oxidation-reduction is representatively used as the electrolytes. Representative redox flow batteries include an iron-chromium-based redox flow battery containing an iron ion for a positive electrode and a Cr ion for a negative electrode, and a vanadium-based redox flow battery containing a V ion for both of positive and negative electrodes (e.g., Japanese Patent Laying-Open No. 2006-147374 (Patent Literature 1)).

CITATION LIST

Patent Literature

PTL 1: Japanese Patent Laying-Open No. 2006-147374

SUMMARY OF INVENTION

Technical Problem

The vanadium-based redox flow battery has been commercialized, and its continued use is expected. It cannot be said, however, that the conventional iron-chromium-based redox flow battery and vanadium-based redox flow battery have a sufficiently high electromotive force. In order to meet future worldwide demand, it is desired to develop a new redox flow battery having a higher electromotive force and containing a metal ion used for an active material that can be supplied stably, and preferably can be supplied stably at low cost.

Therefore, an object of the present invention is to provide a redox flow battery capable of generating a high electromotive force. Another object of the present invention is to provide a method of operating a redox flow battery capable of maintaining a state where the battery has excellent battery properties.

Solution to Problem

One possible way to improve an electromotive force is to use a metal ion having a high standard oxidation-reduction potential for an active material. Metal ions $Fe^{2+}/Fe^{3+}$ and $V^{4+}/V^{5+}$ for a positive electrode active material used in a conventional redox flow battery have standard oxidation-reduction potentials of 0.77V and 1.0V, respectively. The present inventors studied a redox flow battery containing, as a metal ion for a positive electrode active material, manganese which is a water-soluble metal ion, has a standard oxidation-reduction potential higher than those of conventional metal ions, is relatively less expensive than vanadium, and is also considered more preferable in terms of resource supply. $Mn^{2+}/Mn^{3+}$ has a standard oxidation-reduction potential of 1.51V, and a Mn ion has desirable properties for constituting a redox couple having a higher electromotive force.

A redox flow battery uses an aqueous solution as an electrolyte. In the redox flow battery, therefore, as side reaction of charge and discharge reaction, hydrogen gas may be generated at the negative electrode and oxygen gas may be generated at the positive electrode due to the decomposition of water. The studies by the present inventors have found that, in a redox flow battery using a positive electrode electrolyte containing a Mn ion as a positive electrode active material, the side reaction at the positive electrode becomes dominant because Mn acting as the positive electrode active material has an oxidation-reduction potential nobler than that of Fe or V that has been conventionally used as a positive electrode active material. In this case, a state of charge (SOC; also referred to as depth of charge) of the negative electrode electrolyte gradually becomes higher than that of the positive electrode electrolyte. When the difference in SOC occurs between the electrolytes in this manner, a battery capacity of the redox flow battery decreases significantly compared to that in an initial state. This problem needs to be addressed.

The present invention is defined below based on the studies and findings described above.

In a redox flow battery of the present invention, a positive electrode electrolyte stored in a positive electrode tank and a negative electrode electrolyte stored in a negative electrode tank are supplied to a battery element including a positive electrode, a negative electrode, and a membrane interposed between these electrodes, to charge and discharge the battery. The positive electrode electrolyte in the redox flow battery of the present invention contains a Mn ion as a positive electrode active material, and the negative electrode electrolyte contains at least one of a Ti ion, a V ion, and a Cr ion as a negative electrode active material. The redox flow battery of the present invention includes a negative-electrode-side introduction duct in communication with inside of the negative electrode tank from outside thereof, for introducing oxidizing gas into the negative electrode tank, and a negative-electrode-side supply mechanism for supplying the oxidizing gas into the negative electrode tank via the negative-electrode-side introduction duct.

A method of operating a redox flow battery of the present invention uses the redox flow battery of the present invention described above, and includes the step of introducing the oxidizing gas into the negative electrode tank in order to oxidize the negative electrode active material contained in the negative electrode electrolyte.

According to the redox flow battery and the method of operating the same of the present invention, when a difference in state of charge occurs between the positive electrode electrolyte and the negative electrode electrolyte as a result of repeated charge and discharge, the oxidizing gas is introduced into the negative electrode electrolyte to oxidize the negative electrode electrolyte, thereby reducing the difference. By reducing the difference in state of charge between both electrolytes, the battery capacity of the redox flow battery can be restored almost to the initial battery capacity.

Preferred embodiments of the redox flow battery and the method of operating the same of the present invention will be described.

As one embodiment of the redox flow battery of the present invention, preferably, the oxidizing gas contains oxygen.

The oxidizing gas is not particularly limited as long as it can oxidize the negative electrode electrolyte, and may be chlorine, for example. In consideration of the safety in handling the oxidizing gas, however, it is preferable to employ gas containing oxygen, such as pure oxygen, ozone, or air.

Preferably, the redox flow battery of the present invention includes a gas-phase communicating tube bringing a gas phase of the positive electrode tank in communication with a gas phase of the negative electrode tank.

As already mentioned, oxygen gas is generated as the side reaction at the positive electrode side. By providing the gas-phase communicating tube, therefore, the oxygen gas generated at the positive electrode side can be utilized to oxidize the negative electrode electrolyte. The oxygen gas can be introduced from the positive electrode tank into the negative electrode tank by normally opening the gas-phase communicating tube. Naturally, the gas-phase communicating tube may be normally closed, and opened when introducing the oxidizing gas into the negative electrode tank via the negative-electrode-side introduction duct.

Preferably, the redox flow battery of the present invention includes a monitor mechanism for monitoring a state of charge of the redox flow battery.

The monitor mechanism may be implemented by a monitor cell having a structure similar to that of the battery element, for example. The monitor cell may be structured to be supplied with the actually used positive and negative electrolytes from the positive electrode tank and the negative electrode tank, respectively. Alternatively, a monitor mechanism that allows visual inspection of the degree of transparency of the electrolytes (e.g., a transparent window provided on the tanks or on a duct connecting the tanks to the battery element) may be employed. As will be described later, if a Ti ion is used as the negative electrode active material, a solution of a trivalent Ti ion ($Ti^{3+}$) is black, and a solution of a tetravalent Ti ion ($Ti^{4+}$) is nearly transparent. That is, when the redox flow battery is completely discharged and $Ti^{4+}$ becomes dominant in the negative electrode electrolyte, if the negative electrode electrolyte has a low degree of transparency, it can be determined that the state of charge of the negative electrode electrolyte is higher than the state of charge of the positive electrode electrolyte, and if the negative electrode electrolyte has a high degree of transparency, it can be determined that the states of charge of both electrolytes are almost equal to each other.

Preferably, the negative-electrode-side introduction duct included in the redox flow battery of the present invention opens into a liquid phase of the negative electrode tank.

While the negative-electrode-side introduction duct may open into a gas phase, the negative electrode electrolyte can be oxidized more efficiently when the duct opens into the liquid phase.

Preferably, the redox flow battery of the present invention includes an agitation mechanism provided in the negative electrode tank for agitating the negative electrode electrolyte.

The negative electrode electrolyte can be efficiently oxidized when agitated.

This effect is improved by combining the agitation with the feature that the negative-electrode-side introduction duct opens into the liquid phase.

Preferably, the positive electrode electrolyte used in the redox flow battery of the present invention contains a Ti ion.

If a Mn ion is used as the positive electrode active material, $MnO_2$ is precipitated due to charge and discharge. Regarding this problem, while the precise mechanism is not clear, the studies by the present inventors have found that the precipitation can be effectively suppressed by containing a Mn ion as well as a Ti ion in the positive electrode electrolyte.

If the positive electrode electrolyte contains a Mn ion and a Ti ion as described above, preferably, the negative electrode electrolyte contains a Ti ion as the negative electrode active material, and further contains a Mn ion.

The above constitution equalizes the types of metal ions in the positive electrode electrolyte with the types of metal ions in the negative electrode electrolyte. As a result, the following effects can be provided. Namely, (1) a phenomenon in which the battery capacity decreases due to a relative reduction in the amount of metal ions that would originally react at each electrode resulting from the movement of the metal ions to a counter electrode through the membrane of the battery element can be effectively prevented, (2) even if liquid transfer (phenomenon in which an electrolyte of one electrode moves to the other electrode through the membrane) occurs over time due to charge and discharge to cause a difference in amount of electrolyte and ion concentration between both electrodes, the difference can be readily corrected by mixing the electrolytes of both electrodes with each other, and (3) high manufacturability of the electrolytes is attained.

If both electrolytes contain the same types of metal ions, preferably, the redox flow battery of the present invention includes a liquid-phase communicating tube bringing a liquid phase of the positive electrode tank in communication with a liquid phase of the negative electrode tank.

That both electrolytes contain the same types of metal ions means that both electrolytes can be mixed with each other. When both electrolytes are mixed with each other, the redox flow battery is completely discharged. Further, as will be described later, if a Ti/Mn-based electrolyte is used as both electrolytes, both electrolytes should be mixed with each other to completely discharge the battery before the mixed electrolyte is oxidized, so that it can be readily determined when to end the oxidation operation. This is because the Ti/Mn-based electrolyte becomes transparent upon being discharged.

If the liquid-phase communicating tube is provided, preferably, the redox flow battery of the present invention includes a positive-electrode-side introduction duct in communication with inside of the positive electrode tank from outside thereof, for introducing oxidizing gas into the positive electrode tank, and a positive-electrode-side supply mechanism for supplying the oxidizing gas into the positive electrode tank via the positive-electrode-side introduction duct.

With this structure, when both electrolytes are mixed with each other by opening the liquid-phase communicating tube, the mixed electrolyte can be quickly oxidized.

As one embodiment of the method of operating a redox flow battery of the present invention, preferably, the oxidizing gas is introduced when a difference in state of charge occurs between the positive electrode electrolyte and the negative electrode electrolyte.

By correcting the difference in state of charge between both electrolytes when the difference occurs, the redox flow battery can be efficiently operated. Alternatively, unlike this structure, the redox flow battery may be operated while the oxidizing gas is introduced into the negative electrode tank.

As one embodiment of the method of operating a redox flow battery of the present invention, preferably, the states of charge of the positive electrode electrolyte and the negative electrode electrolyte are nearly equalized with each other by controlling an amount of the oxidizing gas to be introduced.

The amount of the oxidizing gas to be introduced may be adjusted based on a result of monitoring the states of charge of both electrolytes with a monitor cell. By equalizing the states of charge of both electrolytes in this manner, a period of time before a difference in state of charge occurs again between both electrolytes can be extended.

As one embodiment of the method of operating a redox flow battery of the present invention, a degree of transparency of the negative electrode electrolyte may be used.

As described above, if a Ti ion is used as the negative electrode active material, when the redox flow battery is completely discharged and $Ti^{4+}$ becomes dominant in the negative electrode electrolyte, the difference in state of charge between both electrolytes can be determined by observation of the degree of transparency of the negative electrode electrolyte. The higher the amount of $Ti^{3+}$ in the discharged negative electrode electrolyte, the lower the degree of transparency of the negative electrode electrolyte, which indicates a difference in state of charge between both electrolytes. Further, as will be described in the following embodiments, if a Mn ion is used as the positive electrode active material, the state of charge of the positive electrode electrolyte can also be determined by the degree of transparency of the positive electrode electrolyte. This will be described in detail in the embodiments.

As one embodiment of the method of operating a redox flow battery of the present invention, preferably, the operation is performed while a state of charge of the redox flow battery is monitored.

The monitoring may be performed based on the degrees of transparency of the electrolytes, or with a monitor cell if the redox flow battery includes the monitor cell.

Advantageous Effects of Invention

The redox flow battery of the present invention has a high electromotive force, and is capable of restoring a decreased battery capacity due to charge and discharge. When the battery capacity of the redox flow battery of the present invention decreases due to charge and discharge, the method of operating a redox flow battery of the present invention can restore the decreased battery capacity.

DESCRIPTION OF EMBODIMENTS

<First Embodiment>
<<General Structure>>

Figure 1:
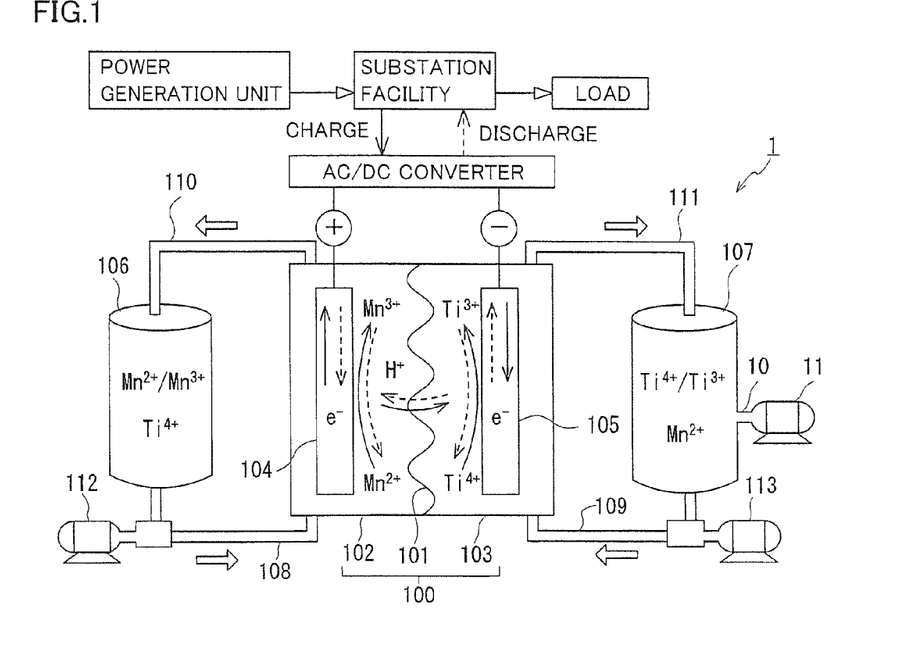
FIG. 1 is a schematic diagram of a redox flow battery in a first embodiment.
Figure 2:
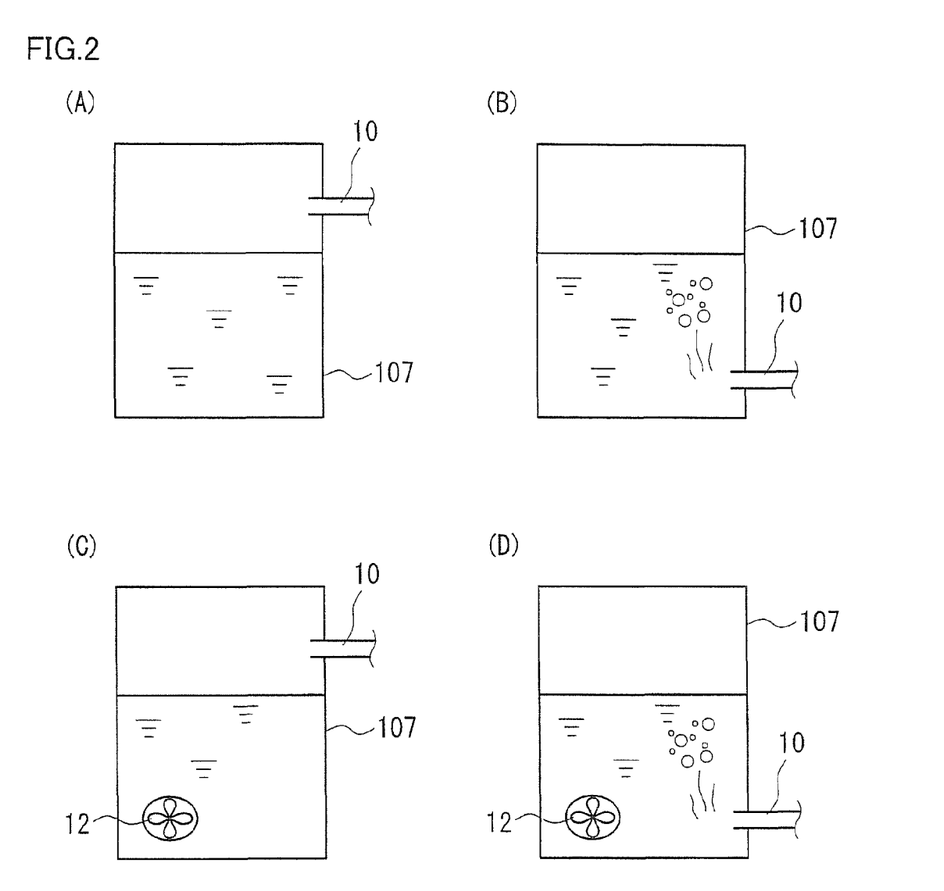
FIG. 2(A) is a schematic explanatory diagram showing how a negative-electrode-side introduction duct is formed in a negative electrode tank of the redox flow battery shown in FIG. 1, illustrating a state where the negative-electrode-side introduction duct opens to a gas phase of the negative electrode tank.
FIG. 2(B) is a schematic explanatory diagram similar to FIG. 2(A), illustrating a state where the negative-electrode-side introduction duct opens to a liquid phase of the negative electrode tank.
FIG. 2(C) is a schematic explanatory diagram similar to FIG. 2(A), illustrating a state where an agitation mechanism is provided in the liquid phase in addition to the state of FIG. 2(A).
FIG. 2(D) is a schematic explanatory diagram similar to FIG. 2(A), illustrating a state where the agitation mechanism is provided in the liquid phase in addition to the state of FIG. 2(B).

A redox flow battery (hereinafter referred to as RF battery) 1 containing a Mn ion as a positive electrode active material and a Ti ion as a negative electrode active material will be generally described with reference to FIGS. 1 and 2. In FIG. 1, solid line arrows indicate charge, and broken line arrows indicate discharge. FIG. 1 illustrates metal ions in their representative forms, and forms other than those illustrated may be included. For example, while FIG. 1 shows $Ti^{4+}$ as a tetravalent Ti ion, another form such as $TiO^{2+}$ may be included.

As shown in FIG. 1, RF battery 1 is representatively connected through an AC/DC converter to a power generation unit (e.g., a solar photovoltaic power generator, a wind power generator, or a common power plant) and to a load such as a power system or a consumer, is charged with the power generation unit as a power supply source, and is discharged to provide power to the load. As with a conventional RF battery, RF battery 1 includes a battery element 100, and a circulation mechanism (tanks, ducts, pumps) for circulating an electrolyte through battery element 100. RF battery 1 is different from the conventional RF battery in that it uses a Mn ion as a positive electrode active material for a positive electrode electrolyte, and has a structure (a negative-electrode-side introduction duct 10 and a negative-electrode-side supply mechanism 11 to be described later) for suppressing a decrease in battery capacity due to charge and discharge. The structure of RF battery 1 will be described in detail, and then a method of operating RF battery 1 will be described.

[Battery Element and Circulation Mechanism]

Battery element 100 included in RF battery 1 includes a positive electrode cell 102 having a positive electrode 104 therein, a negative electrode. cell 103 having a negative electrode 105 therein, and a membrane 101 separating cells 102 and 103 from each other, through which ions permeate. Positive electrode cell 102 is connected to a positive electrode tank 106 storing a positive electrode electrolyte through ducts 108 and 110. Negative electrode cell 103 is connected to a negative electrode tank 107 storing a negative electrode electrolyte through ducts 109 and 111. Ducts 108 and 109 include pumps 112 and 113 for circulating the electrolytes of the electrodes, respectively. In battery element 100, the positive electrode electrolyte in positive electrode tank 106 and the negative electrode electrolyte in negative electrode tank 107 are supplied to positive electrode cell 102 (positive electrode 104) and negative electrode cell 103 (negative electrode 105) by circulation, respectively, through ducts 108 to 111 and pumps 112, 113, to charge and discharge the battery by valence change reaction of metal ions (Mn ion for the positive electrode and Ti ion for the negative electrode) acting as active materials in the electrolytes of the electrodes.

Battery element 100 usually has a form referred to as a cell stack including a plurality of stacked cells. Cells 102 and 103 forming battery element 100 are representatively structured with a cell frame, which includes a bipolar plate (not shown) having positive electrode 104 arranged on one surface and negative electrode 105 on the other surface, and a frame (not shown) having a liquid supply hole for supplying the electrolytes and a liquid drainage hole for draining the electrolytes, and formed on the periphery of the bipolar plate. By stacking a plurality of cell frames, the liquid supply holes and the liquid drainage holes form a fluid path for the electrolytes, which is connected to ducts 108 to 111. The cell stack is structured by successively and repeatedly stacking the cell frame, positive electrode 104, membrane 101, negative electrode 105, the cell frame . . . . A known structure may be used as appropriate as a basic structure of the RF battery.

[Electrolyte]

The positive and negative electrolytes used in RF battery 1 in this embodiment are the same electrolyte containing a Mn ion and a Ti ion. The Mn ion acts as a positive electrode active material on the positive electrode side, and the Ti ion acts as a negative electrode active material on the negative electrode side. While the reason is not known, the Ti ion on the positive electrode side suppresses the precipitation of $MnO_2$. Preferably, each of the Mn ion and the Ti ion has a concentration of not less than 0.3M and not more than 5M.

At least one type of aqueous solution selected from $H_2SO_4$, $K_2SO_4$, $Na_2SO_4$, $H_3PO_4$, $H_4P_2O_7$, $K_2PO_4$, $Na_3PO_4$, $K_3PO_4$, $HNO_3$, $KNO_3$, and $NaNO_3$ can be used as a solvent for the electrolytes.

[Negative-Electrode-Side Introduction Duct]

Negative-electrode-side introduction duct 10 is a duct for introducing oxidizing gas into negative electrode tank 107. The oxidizing gas may be pure oxygen, air, ozone or the like. Negative-electrode-side introduction duct 10 only needs to be in communication with negative electrode tank 107. For example, an embodiment in which duct 10 opens to a gas phase of negative electrode tank 107 as shown in FIG. 2(A), or an embodiment in which duct 10 opens to a liquid phase of negative electrode tank 107 as shown in FIG. 2(B) may be employed. Alternatively, as shown in FIGS. 2(C) and 2(D), embodiments in which an agitation mechanism 12 such as a screw is added to the structures shown in FIGS. 2(A) and 2(B) may be employed. It should be noted that negative electrode tank 107 is provided with a not-shown open valve, to prevent an unnecessary increase in pressure within negative electrode tank 107 upon introduction of the oxidizing gas via negative-electrode-side introduction duct 10.

Preferably, negative-electrode-side introduction duct 10 is provided with an open/close mechanism such as a valve, to control the communication and non-communication of negative-electrode-side introduction duct 10. Preferably, negative-electrode-side introduction duct 10 is normally closed to suppress evaporation of the negative electrode electrolyte.

[Negative-Electrode-Side Supply Mechanism]

Negative-electrode-side supply mechanism 11 is a mechanism for introducing the oxidizing gas into negative electrode tank 107 via negative-electrode-side introduction duct 10. For example, a fan (if negative-electrode-side introduction duct 10 is in communication with the gas phase) or a squeeze pump may be employed.

[Others]

Although not shown, RF battery 1 may include a monitor cell for monitoring a battery capacity. The monitor cell is a single cell smaller than battery element 100, which basically has a structure similar to that of battery element 100. The monitor cell is supplied with the positive and negative electrolytes from positive electrode tank 106 and negative electrode tank 107, and generates an electromotive force as with battery element 100. The battery capacity of RF battery 1 can be measured from the electromotive force.

<<Method of Operating RF Battery>>

When RF battery 1 having the above structure is operated (charged and discharged repeatedly), the battery capacity gradually decreases. In this case, RF battery 1 is completely discharged, and the oxidizing gas is introduced into negative electrode tank 107 by opening negative-electrode-side introduction duct 10 to operate negative-electrode-side supply mechanism 11. The timing of introduction of the oxidizing gas, and the amount of the oxidizing gas to be introduced may be determined based on the electromotive force sensed by a monitor cell, if RF battery 1 includes the monitor cell. Alternatively, the determination may be made based on the degree of transparency of the negative electrode electrolyte. Trivalent Ti ($Ti^{3+}$) is brown and tetravalent Ti ($Ti^{4+}$) is nearly colorless and transparent. Thus, the introduction of the oxidizing gas may be started when a decrease in the degree of transparency of the negative electrode electrolyte is confirmed visually or by spectoscopic analysis or by light transmittance, and the introduction of the oxidizing gas may be ended with an increase in the degree of transparency.

The oxidizing gas may be introduced simultaneously during the operation of RF battery 1. As a result, RF battery 1 can be operated while a decrease in battery capacity of RF battery 1 is suppressed. In consideration of evaporation of the negative electrode electrolyte, it is preferable to open negative-electrode-side introduction duct 10 intermittently rather than normally. It is also preferable to monitor the amount of the negative electrode electrolyte, and to add a solvent as appropriate.

<Second Embodiment>

Figure 3:
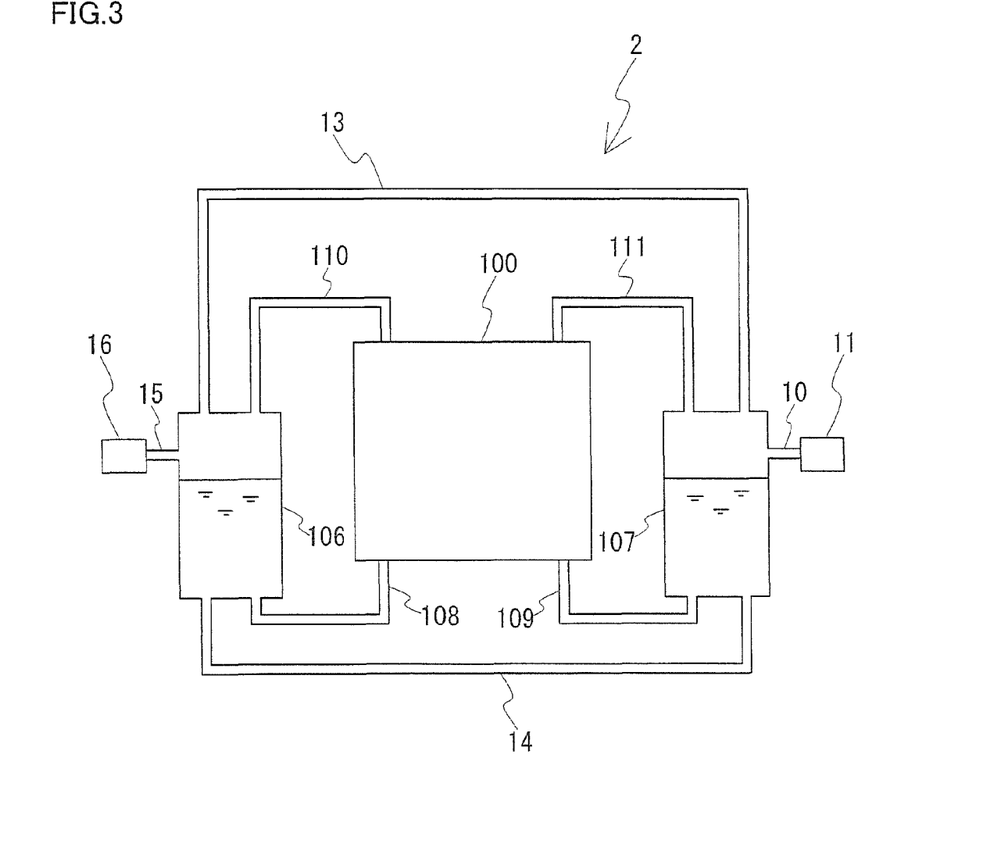
FIG. 3 is a schematic diagram of a redox flow battery in a second embodiment.

In a second embodiment, an RF battery 2 including additional features to the structure in the first embodiment will be described with reference to FIG. 3. FIG. 3 is a simplified diagram only illustrating how the ducts are connected.

<<General Structure>>

In addition to the structure of the RF battery in the first embodiment, RF battery 2 in the second embodiment includes a gas-phase communicating tube 13, a liquid-phase communicating tube 14, a positive-electrode-side introduction duct 15, and a positive-electrode-side supply mechanism 16.

[Gas-Phase Communicating Tube]

Gas-phase communicating tube 13 is a duct bringing the gas phase of positive electrode tank 106 in communication with the gas phase of negative electrode tank 107. By providing gas-phase communicating tube 13, oxygen generated by side reaction on the positive electrode side due to charge and discharge can be introduced into negative electrode tank 107. Preferably, gas-phase communicating tube 13 is provided with a valve or the like, to control the communication and non-communication between tanks 106 and 107.

[Liquid-Phase Communicating Tube]

Liquid-phase communicating tube 14 is a duct bringing the liquid phase of positive electrode tank 106 in communication with the liquid phase of negative electrode tank 107. By providing liquid-phase communicating tube 14, the electrolytes in tanks 106 and 107 can be mixed with each other. Liquid-phase communicating tube 14 is provided with a valve or the like, to prevent mixing of the electrolytes stored in tanks 106 and 107 during charge and discharge.

If liquid-phase communicating tube 14 that allows mixing of the positive electrode electrolyte with the negative electrode electrolyte is provided, the types of metal ions contained in both electrolytes need to be the same. For example, an electrolyte containing a Mn ion and a Ti ion may be used as both electrolytes. The Mn ion acts as a positive electrode active material in the positive electrode electrolyte, and the Ti ion acts as a negative electrode active material in the negative electrode electrolyte.

[Positive-Electrode-Side Introduction Duct and Positive-Electrode-Side Supply Mechanism]

Positive-electrode-side introduction duct 15 and positive-electrode-side supply mechanism 16 may be structured in a manner similar to those of negative-electrode-side introduction duct 10 and negative-electrode-side supply mechanism 11, respectively.

[Others]

Preferably, an agitation mechanism is provided in the liquid phase of positive electrode tank 106, as in the first embodiment.

<<Method of Operating RF Battery>>

When RF battery 2 is charged and discharged, gas-phase communicating tube 13 is basically opened, and liquid-phase communicating tube 14 is closed. When the battery capacity of RF battery 2 is restored, on the other hand, gas-phase communicating tube 13 is opened, and liquid-phase communicating tube 14 is also opened. By opening liquid-phase communicating tube 14, the positive and negative electrolytes are mixed with each other to quickly discharge RF battery 2. Then, the oxidizing gas is introduced into negative electrode tank 107 via negative-electrode-side introduction duct 10, and the oxidizing gas is also introduced into positive electrode tank 106 via positive-electrode-side introduction duct 15. If tanks 106 and 107 each include an agitation mechanism, the agitation mechanism may be operated during this time.

The timing of the restoration of the battery capacity of RF battery 2, the amount of the oxidizing gas to be introduced, and the timing of the end of the introduction may be determined with the monitor cell, or based on the degree of transparency of the mixed electrolyte of the positive and negative electrolytes, as in the first embodiment. A solution of $Mn^{3+}$ is colored, and a solution of $Mn^{2+}$ is nearly colorless and transparent. When RF battery 2 is discharged and $Mn^{2+}$ becomes dominant in the electrolyte, the degree of transparency of the electrolyte increases. Likewise, when RF battery 2 is discharged, a solution of $Ti^{4+}$ which becomes dominant in the electrolyte is nearly colorless and transparent. Accordingly, the mixed electrolyte obtained with a decreased battery capacity has a low degree of transparency, and the mixed electrolyte obtained after the battery capacity was restored by the oxidizing gas has a high degree of transparency.

FIRST EXPERIMENTAL EXAMPLE

RF battery 2 having a structure similar to that in the second embodiment described with reference to FIG. 3 was fabricated. As the positive electrode electrolyte and the negative electrode electrolyte, an electrolyte containing sulfuric acid having a concentration of 2M, $MnSO_4$ ($Mn^{2+}$) having a concentration of 1M, and $TiOSO_4$ ($Ti^{4+}$) having a concentration of 1M mixed therein was used. Tanks 106 and 107 were filled with 3 L of the positive electrolyte and 3 L of the negative electrolyte, respectively, in an airtight manner from the external atmosphere. The gas phase sections were filled with nitrogen gas in order to suppress oxidation. As battery element 100, a single cell having an electrode area of 500 $cm^2$ employing a carbon felt electrode and a cation exchange membrane was used. Liquid-phase communicating tube 14 and gas-phase communicating tube 13 remained closed.

This experimentally fabricated Ti/Mn-based RF battery 2 was subjected to charge and discharge tests. The initial performance was a current efficiency of 99%, a cell resistivity of 1.5 $\Omega cm^2$, and a battery capacity of 45 Ah. As a result of operating (charging and discharging) this RF battery 2 for about a month, the battery capacity gradually decreased to about 75% of the initial capacity. The operation of RF battery 2 was further continued until the battery capacity of RF battery 2 decreased to about 65% of the initial capacity around 65 days after the start of the operation, when the operation of RF battery 2 was suspended. Liquid-phase communicating tube 14 and gas-phase communicating tube 13 remained closed during the period of operation RF battery 2.

Upon suspension of the operation of RF battery 2, components of gas remaining in the gas phase of positive electrode tank 106 were analyzed. Several % by volume of oxygen gas, and a very small amount of $CO_2$ were detected. Hydrogen gas was less than the limit of detection. On the other hand, gas components in the gas phase of negative electrode tank 107 were mostly nitrogen gas.

Next, the positive electrode electrolyte and the negative electrode electrolyte were sufficiently mixed with each other by opening liquid-phase communicating tube 14, to completely discharge RF battery 2. At this point, the mixed electrolyte was black (colored and non-transparent).

Next, air (oxidizing gas) was introduced into positive electrode tank 106 and negative electrode tank 107 via positive-electrode-side introduction duct 15 and negative-electrode-side introduction duct 10 provided on tanks 106 and 107, respectively. The mixed electrolyte in tanks 106 and 107 was visually observed during this time, and it was confirmed that the mixed electrolyte gradually became transparent. Finally, when it was visually confirmed that the mixed electrolyte became nearly transparent, the introduction of air was stopped (about 7 days between the start and the end of introduction). After the end of the introduction of air, charge and discharge was repeated again. A graph shown in FIG. 4 illustrates variation in battery capacity of RF battery 2 between the start and the end of the tests.

Figure 4:
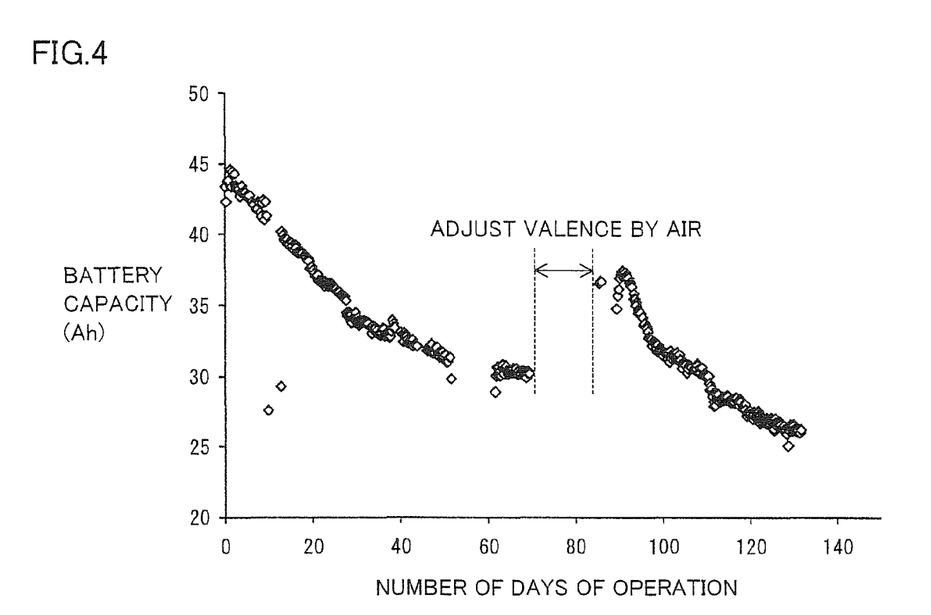
FIG. 4 is a graph showing relation between the number of days of operation and a battery capacity (Ah) of a redox flow battery in a first experimental example.

As is clear from the results in the graph shown in FIG. 4, it was demonstrated that the battery capacity of RF battery 2 was significantly restored by the introduction of air into the mixed electrolyte.

SECOND EXPERIMENTAL EXAMPLE

RF battery 2 having a structure similar to that in the first experimental example was subjected to charge and discharge tests, with gas-phase communicating tube 13 being opened (liquid-phase communicating tube 14 being closed). As a result, it was confirmed that it took about 90 days after the start of the tests until the battery capacity decreased to about 65% of the initial capacity, indicating a lower rate of decrease in battery capacity of RF battery 2. This result was not sufficient to effectively suppress the decrease in battery capacity of RF battery 2.

Therefore, next, charge and discharge (gas-phase communicating tube 13 being opened and liquid-phase communicating tube 14 being closed) was repeated while the air is introduced into negative electrode tank 107 via negative-electrode-side introduction duct 10. As a result, a phenomenon in which the battery capacity was gradually restored was observed. During this time, the degree of restoration of the battery capacity could be controlled by adjusting the amount of air to be introduced into negative electrode tank 107 by opening/closing the valve of negative-electrode-side introduction duct 10, controlling the pressure of air blown by negative-electrode-side supply mechanism 11, and controlling the time of blowing air, and the like. Moreover, by controlling the amount of air to be introduced depending on the states of charge of the positive and negative electrolytes while the states were measured with a monitor cell, the battery capacity could be normally kept constant. By applying these results, for example, by introducing a prescribed amount of air into negative electrode tank 107 for a prescribed period of time when the battery capacity decreased by 10% compared to the initial capacity from the measurement results with the monitor cell, stable operation of RF battery 2 can be implemented.

The present invention is not limited to the above embodiments, but can be implemented with appropriate variations without departing from the scope of the invention. For example, a V ion or a Cr ion can be utilized as a negative electrode active material for a negative electrode electrolyte to be used. In this case, the structure in the first embodiment in which the positive and negative electrolytes are not mixed with each other is employed.

Industrial Applicability

The redox flow battery of the present invention can be suitably utilized as a large-capacity storage battery for stabilizing variations in power generation output, storing surplus generated power, and load leveling, for power generation of new energy such as solar photovoltaic power generation and wind power generation. The redox flow battery of the present invention can also be suitably utilized as a large-capacity storage battery attached to a common power plant for voltage sag and power failure prevention and for load leveling. The method of operating a redox flow battery of the present invention can be suitably utilized when the redox flow battery of the present invention is used in the various applications described above.

Reference Signs List 1, 2 redox flow battery; 100 battery element; 101 membrane; 102 positive electrode cell; 103 negative electrode cell; 104 positive electrode; 105 negative electrode; 106 positive electrode tank; 107 negative electrode tank; 108, 109, 110, 111 duct; 112, 113 pump; 10 negative-electrode-side introduction duct; 11 negative-electrode-side supply mechanism; 12 agitation mechanism; 13 gas-phase communicating tube; 14 liquid-phase communicating tube; 15 positive-electrode-side introduction duct; 16 positive-electrode-side supply mechanism.

The invention claimed is:

1. A redox flow battery in which a positive electrode electrolyte stored in a positive electrode tank and a negative electrode electrolyte stored in a negative electrode tank are supplied to a battery element including a positive electrode, a negative electrode, and a membrane interposed between these electrodes, to charge and discharge the battery,
    said positive electrode electrolyte containing a Mn ion as a positive electrode active material,
    said negative electrode electrolyte containing at least one of a Ti ion, a V ion, and a Cr ion as a negative electrode active material,
    said redox flow battery comprising:
    a negative-electrode-side introduction duct in communication with inside of said negative electrode tank from outside thereof, for introducing oxidizing gas into said negative electrode tank; and
    a negative-electrode-side supply mechanism for supplying said oxidizing gas into said negative electrode tank via said negative-electrode-side introduction duct.

2. The redox flow battery according to claim 1, wherein said oxidizing gas contains oxygen.

3. The redox flow battery according to claim 1, comprising a gas-phase communicating tube bringing a gas phase of said positive electrode tank in communication with a gas phase of said negative electrode tank.

4. The redox flow battery according to claim 1, comprising a monitor mechanism for monitoring a state of charge of said redox flow battery.

5. The redox flow battery according to claim 1, wherein said negative-electrode-side introduction duct opens into a liquid phase of said negative electrode tank.

6. The redox flow battery according to claim 1, comprising an agitation mechanism provided in said negative electrode tank for agitating said negative electrode electrolyte.

7. The redox flow battery according to claim 1, wherein said positive electrode electrolyte contains a Ti ion.

8. The redox flow battery according to claim 7, wherein said negative electrode electrolyte contains a Ti ion as the negative electrode active material, and further contains a Mn ion.

9. The redox flow battery according to claim 8, comprising a liquid-phase communicating tube bringing a liquid phase of said positive electrode tank in communication with a liquid phase of said negative electrode tank.

10. The redox flow battery according to claim 9, comprising:
    a positive-electrode-side introduction duct in communication with inside of said positive electrode tank from outside thereof, for introducing oxidizing gas into said positive electrode tank; and
    a positive-electrode-side supply mechanism for supplying said oxidizing gas into said positive electrode tank via said positive-electrode-side introduction duct.

11. A method of operating a redox flow battery using the redox flow battery according to claim 1, comprising the step of introducing said oxidizing gas into said negative electrode tank in order to oxidize the negative electrode active material contained in said negative electrode electrolyte.

12. The method of operating a redox flow battery according to claim 11, wherein
    said oxidizing gas is introduced when a difference in state of charge occurs between said positive electrode electrolyte and said negative electrode electrolyte.

13. The method of operating a redox flow battery according to claim 12, wherein
    the states of charge of said positive electrode electrolyte and said negative electrode electrolyte are nearly equalized with each other by controlling an amount of said oxidizing gas to be introduced.

14. The method of operating a redox flow battery according to claim 13, wherein
    a degree of transparency of said negative electrode electrolyte is used as a criterion for controlling said amount to be introduced.

15. The method of operating a redox flow battery according to claim 11, wherein
    the operation is performed while a state of charge of said redox flow battery is monitored.

* * * * *